(12) United States Patent
Amemiya

(10) Patent No.: US 11,571,933 B2
(45) Date of Patent: Feb. 7, 2023

(54) TIRE

(71) Applicant: SUMITOMO RUBBER INDUSTRIES, LTD., Hyogo (JP)

(72) Inventor: Taiichiro Amemiya, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 289 days.

(21) Appl. No.: 16/713,470

(22) Filed: Dec. 13, 2019

(65) Prior Publication Data

US 2020/0198407 A1 Jun. 25, 2020

(30) Foreign Application Priority Data

Dec. 20, 2018 (JP) .............................. JP2018-238691

(51) Int. Cl.
*B60C 11/03* (2006.01)
*B60C 11/13* (2006.01)

(52) U.S. Cl.
CPC ...... *B60C 11/0304* (2013.01); *B60C 11/1369* (2013.01); *B60C 2011/039* (2013.01)

(58) Field of Classification Search
CPC ............. B60C 11/0304; B60C 11/1369; B60C 2011/039; B60C 2011/0348
See application file for complete search history.

(56) References Cited

U.S. PATENT DOCUMENTS

| | | | |
|---|---|---|---|
| 2010/0186861 A1* | 7/2010 | Ishiguro ................ | B60C 11/033 152/209.25 |
| 2012/0118455 A1* | 5/2012 | Hada .................... | B60C 11/0304 152/209.8 |
| 2015/0258858 A1* | 9/2015 | Kujime ............... | B60C 11/1392 152/209.8 |
| 2016/0082780 A1 | 3/2016 | Nagahara et al. | |
| 2016/0236517 A1* | 8/2016 | Nagase ............... | B60C 11/0304 |
| 2017/0210175 A1* | 7/2017 | Yoshimura .......... | B60C 11/0309 |
| 2017/0368882 A1* | 12/2017 | Mukai ................. | B60C 11/0302 |
| 2018/0319219 A1* | 11/2018 | Oba .................... | B60C 11/0332 |
| 2019/0375245 A1* | 12/2019 | Miyazaki ............ | B60C 11/1236 |

FOREIGN PATENT DOCUMENTS

JP 2016-064726 4/2016

* cited by examiner

*Primary Examiner* — Cedrick S Williams
(74) *Attorney, Agent, or Firm* — Greenblum & Bernstein, P.L.C.

(57) ABSTRACT

A tire having a tread portion with a designated mounting direction. An outer shoulder land portion has outer shoulder lateral grooves. An inner shoulder land portion has inner shoulder lateral grooves. Each outer shoulder lateral groove includes a first outer portion extending in a tire axial direction at an outer tread edge side, and a second outer portion that connects the first outer portion to an outer shoulder main groove and that has a smaller groove width and groove depth than the first outer portion. Each inner shoulder lateral groove has a tie bar raised at a groove bottom thereof. The tie bar is connected to the inner shoulder main groove.

19 Claims, 7 Drawing Sheets

TIRE

BACKGROUND OF THE INVENTION

Field of the Invention

The present invention relates to a tire including a tread portion.

Description of the Background Art

Japanese Laid-Open Patent Publication No. 2016-064726 discloses a tire having shoulder lug grooves provided on each of a pair of shoulder land portions. Each shoulder lug groove extends from a tread edge inward in the tire axial direction, and terminates at an inner end thereof within the shoulder land portion. Such a shoulder lug groove allows snow within the groove to be discharged to the outer side of the tread edge, and thus good ice and snow road performance is maintained.

Moreover, the length in the tire axial direction of the shoulder lug groove is set to 70% to 90% of the maximum width of the shoulder land portion. Accordingly, high stiffness of the shoulder land portion is ensured, and, furthermore, steering stability on a dry road (hereinafter, sometimes simply referred to as "steering stability") is enhanced in some cases.

However, in recent years, for a tire for which how the tire is to be oriented when mounted to a vehicle is specified, improvement of steering stability with ice and snow road performance maintained is required.

The present invention has been made in view of the above-described problem, and a main object of the present invention is to provide a tire for which how the tire is to be oriented when mounted to a vehicle is specified and that is capable of improving steering stability while maintaining ice and snow road performance.

SUMMARY OF THE INVENTION

A first aspect of the present invention is directed to a tire for which how the tire is to be oriented when mounted to a vehicle is specified, the tire including a tread portion, wherein: the tread portion has an outer tread edge and an inner tread edge located at an outer side of the vehicle and at an inner side of the vehicle, respectively, when the tire is mounted on the vehicle; the tread portion has an outer shoulder main groove continuously extending in a tire circumferential direction at the endmost outer tread edge side, an inner shoulder main groove continuously extending in the tire circumferential direction at the endmost inner tread edge side, an outer shoulder land portion demarcated between the outer tread edge and the outer shoulder main groove, and an inner shoulder land portion demarcated between the inner tread edge and the inner shoulder main groove; the outer shoulder land portion has outer shoulder lateral grooves extending from the outer shoulder main groove toward the outer tread edge side; the inner shoulder land portion has inner shoulder lateral grooves extending from the inner shoulder main groove toward the inner tread edge side; each of the outer shoulder lateral grooves includes a first outer portion extending in a tire axial direction at the outer tread edge side, and a second outer portion that connects the first outer portion to the outer shoulder main groove and that has a smaller groove width and groove depth than the first outer portion; each of the inner shoulder lateral grooves has a tie bar raised at a groove bottom thereof; and the tie bar is connected to the inner shoulder main groove.

In the tire according to the present invention, the groove depth of the second outer portion is preferably smaller than a tie bar depth from a tread surface of the inner shoulder land portion to an outer surface of the tie bar.

In the tire according to the present invention, the groove depth of the second outer portion is preferably 65% to 85% of the tie bar depth.

In the tire according to the present invention, the second outer portion preferably has a length in the tire axial direction larger than a length in the tire axial direction of the tie bar.

In the tire according to the present invention, the length in the tire axial direction of the second outer portion is preferably 150% to 250% of the length in the tire axial direction of the tie bar.

In the tire according to the present invention, the groove width of the second outer portion is preferably equal to or greater than 1.5 mm.

In the tire according to the present invention, preferably, the tread portion includes an outer middle land portion adjacent to an inner side in the tire axial direction of the outer shoulder main groove, and an inner middle land portion adjacent to an inner side in the tire axial direction of the inner shoulder main groove, the outer middle land portion has outer middle sipes that extend in the tire axial direction and that each have one end located within the outer middle land portion, and the inner middle land portion has inner middle sipes crossing the inner middle land portion.

In the tire according to the present invention, a length in the tire axial direction of each of the outer middle sipes is preferably 75% to 90% of a length in the tire axial direction of each of the inner middle sipes.

In a land portion, generally, the stiffness of a region near a main groove is lower than the stiffness of a region at the center side in the width direction of the land portion. Therefore, by making a reduction in the stiffness of the region near the main groove smaller than a reduction in the stiffness of the region at the center side in the width direction of the land portion, the difference in stiffness between the respective regions is decreased, and thus effective friction force can be exerted on a dry road surface over a large range of the tread surface of the land portion. In addition, during turning of a vehicle, generally, greater lateral force acts on an outer shoulder land portion located at the outer side of the vehicle, than on an inner shoulder land portion located at the inner side of the vehicle. Therefore, by keeping the stiffness of the outer shoulder land portion higher than the stiffness of the inner shoulder land portion, smooth turning can be made toward both the inner and outer sides of the vehicle, and thus steering stability can be improved.

In the tire according to the present invention, the outer shoulder land portion has outer shoulder lateral grooves each of which includes: a first outer portion extending in the tire axial direction at the outer tread edge side: and a second outer portion that connects the first outer portion to the outer shoulder main groove and that has a smaller groove width and groove depth than the first outer portion. In addition, the inner shoulder land portion has inner shoulder lateral grooves each including a tie bar raised at a groove bottom thereof. The tie bar is connected to the inner shoulder main groove.

Accordingly, the outer shoulder land portion has a reduced difference between the stiffness of a region near the second outer portion and the stiffness of a region near the first outer portion, and thus can exert effective friction force on a road surface. In addition, the inner shoulder land portion also has a reduced difference between the stiffness of a region near the tie bar and the stiffness of a region near a portion of the inner shoulder lateral groove in which the tie bar is not provided. Furthermore, the second outer portion, which has a smaller groove width and groove depth than the first outer portion, keeps the stiffness of the region near the second outer portion higher, and thus smooth turning can be made toward both the inner and outer sides of the vehicle.

Moreover, the outer shoulder lateral grooves and the inner shoulder lateral grooves exert an edge effect and snow column shearing force on an ice and snow road surface, and also smoothly discharge snow or ice (for example, water may be contained) within the respective grooves to the respective shoulder main grooves.

Therefore, the tire according to the present invention is capable of improving steering stability while keeping ice and snow road performance high.

DESCRIPTION OF THE PREFERRED EMBODIMENTS

Hereinafter, an embodiment of the present invention will be described with reference to the drawings.

Figure 1:
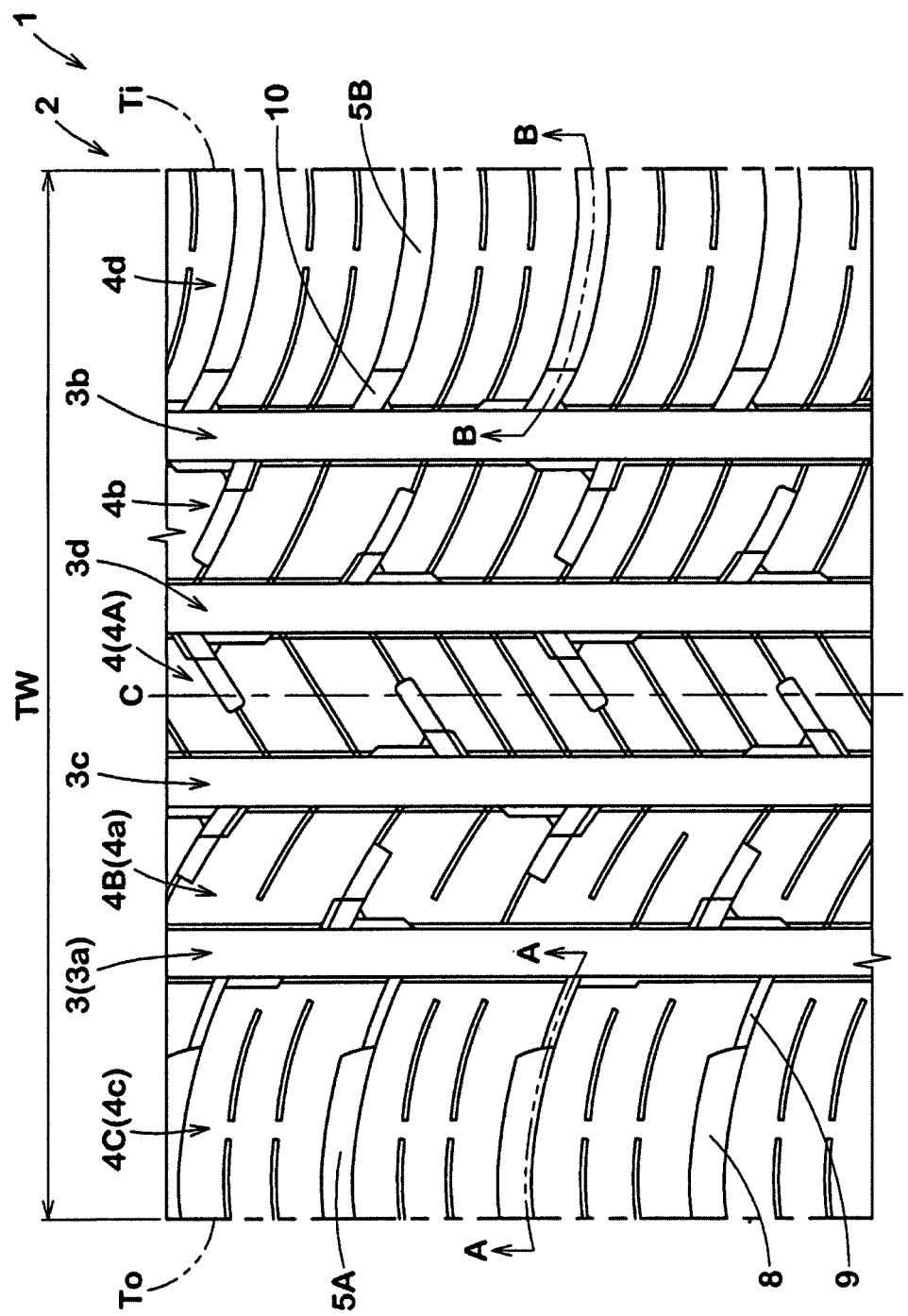
FIG. 1 is a development of a tread portion of a tire according to an embodiment of the present invention.

FIG. 1 is a development of a tread portion 2 of a tire 1 according to the present embodiment. FIG. 1 shows a tread portion 2 of a pneumatic tire for a passenger car as a preferred embodiment. However, the present invention can be applied to a pneumatic tire for a two-wheeled automotive vehicle and a heavy-duty pneumatic tire, and also to tires in the other categories.

For the tire 1 according to the present embodiment, how the tire 1 is to be oriented when mounted to a vehicle is specified. Thus, the tread portion 2 has an outer tread edge To located at the outer side of the vehicle when the tire 1 is mounted on the vehicle, and an inner tread edge Ti located at the inner side of the vehicle when the tire 1 is mounted on the vehicle. How the tire 1 is to be oriented when mounted to a vehicle is indicated, for example, on a sidewall portion (not shown) by characters or the like.

The "tread edges" To and Ti are defined as ground contact positions at both endmost sides in the tire axial direction when a normal load is applied to the tire 1, in a normal state where the tire 1 is mounted to a normal rim and inflated to a normal internal pressure and no load is applied to the tire 1, such that the tire 1 is brought into contact with a plane at a camber angle of 0 degrees. In the normal state, the distance in the tire axial direction between the respective tread edges To and Ti is defined as a tread width TW. Unless otherwise specified, dimensions of components of the tire and the like are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard. In the case where the tire is for a passenger car, the normal internal pressure is 180 kPa.

The "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In the case where the tire is for a passenger car, the normal load is a load corresponding to 88% of the load described above.

The tread portion 2 of the present embodiment has main grooves 3 continuously extending in the tire circumferential direction, and land portions 4 adjacent to the main grooves 3. For the main grooves 3 and the land portions 4, known modes can be selected as appropriate.

In the present embodiment, the main grooves 3 include an outer shoulder main groove 3a, an inner shoulder main groove 3b, an outer crown main groove 3c, and an inner crown main groove 3d. The outer shoulder main groove 3a of the present embodiment is located at the endmost outer tread edge To side. The inner shoulder main groove 3b of the present embodiment is located at the endmost inner tread edge Ti side. The outer crown main groove 3c of the present embodiment is adjacent to the endmost outer shoulder main groove 3a. The inner crown main groove 3d of the present embodiment is adjacent to the endmost inner shoulder main groove 3b.

Accordingly, the land portions 4 of the present embodiment include a crown land portion 4A, a pair of middle land portions 4B, and a pair of shoulder land portions 4C. In the present embodiment, the crown land portion 4A is demarcated between the outer crown main groove 3c and the inner crown main groove 3d. In the present embodiment, the pair of middle land portions 4B include an outer middle land portion 4a demarcated between the outer shoulder main groove 3a and the outer crown main groove 3c, and an inner middle land portion 4b demarcated between the inner shoulder main groove 3b and the inner crown main groove 3d. In the present embodiment, the pair of shoulder land portions 4C include an outer shoulder land portion 4c demarcated between the outer shoulder main groove 3a and the outer tread edge To, and an inner shoulder land portion 4d demarcated between the inner shoulder main groove 3b and the inner tread edge Ti.

Figure 2:
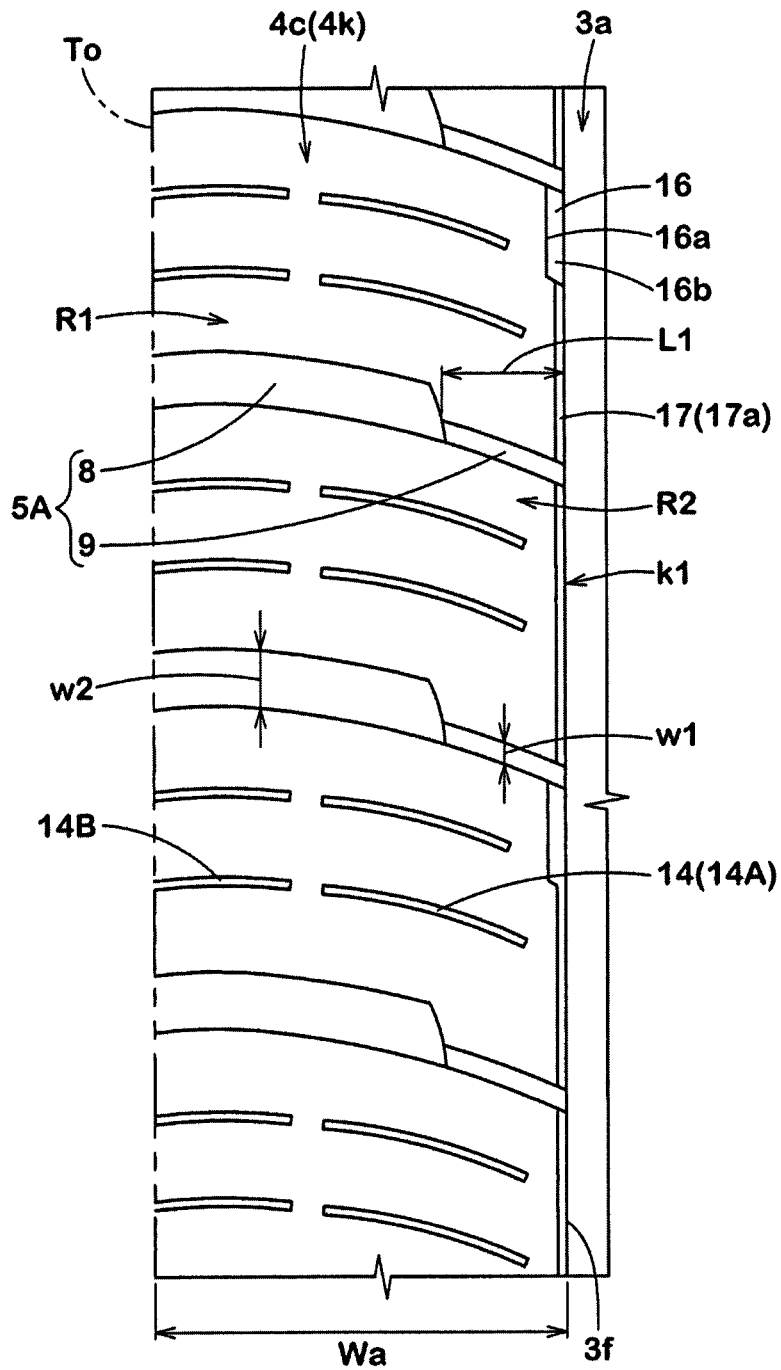
FIG. 2 is an enlarged view of an outer shoulder land portion in FIG. 1.
Figure 3:
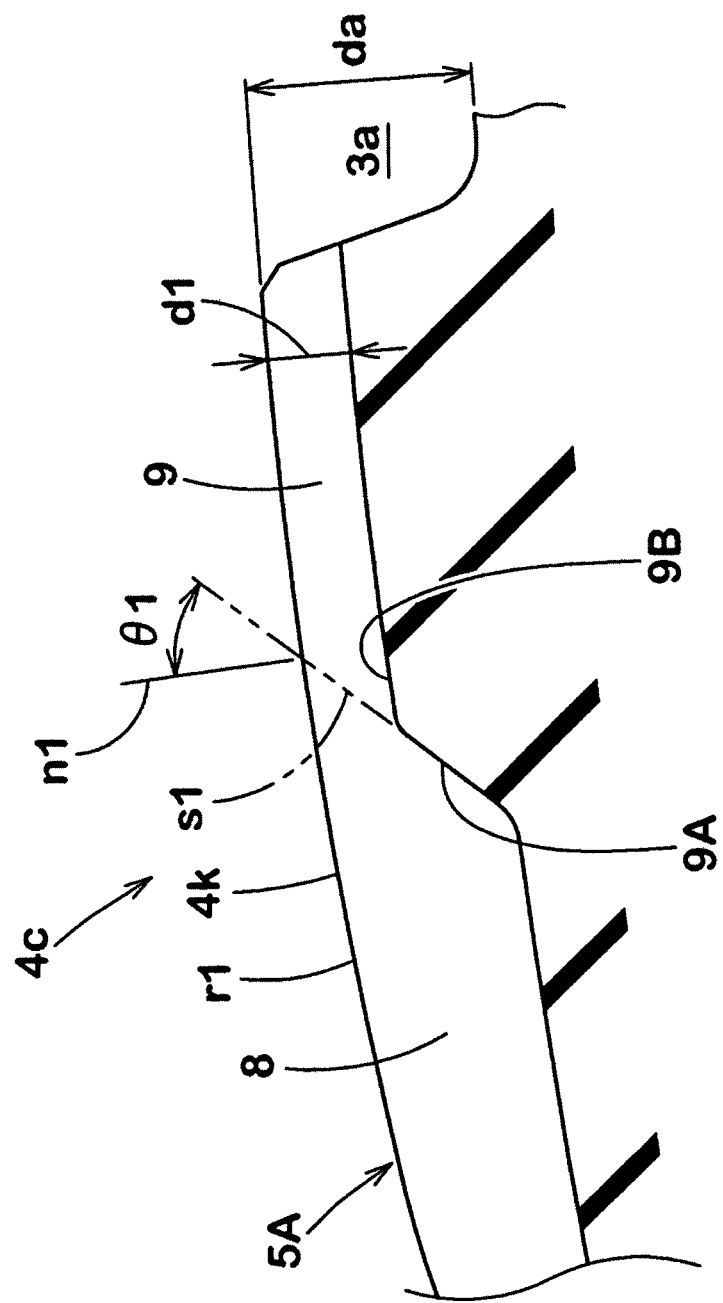
FIG. 3 is a cross-sectional view taken along a line A-A in FIG. 1.

FIG. 2 is a development of the outer shoulder land portion 4c. FIG. 3 is a cross-sectional view taken along a line A-A in FIG. 1. As shown in FIG. 2 and FIG. 3, the outer shoulder land portion 4c has outer shoulder lateral grooves 5A extending in the tire axial direction. Each outer shoulder lateral groove 5A of the present embodiment extends from the outer shoulder main groove 3a toward the outer tread edge To side. In the present embodiment, the outer shoulder lateral groove 5A includes a first outer portion 8 extending in the tire axial direction at the outer tread edge To side, and a second outer portion 9 that connects the first outer portion 8 to the outer shoulder main groove 3a and that has a smaller groove width and groove depth than the first outer portion 8.

Figure 4:
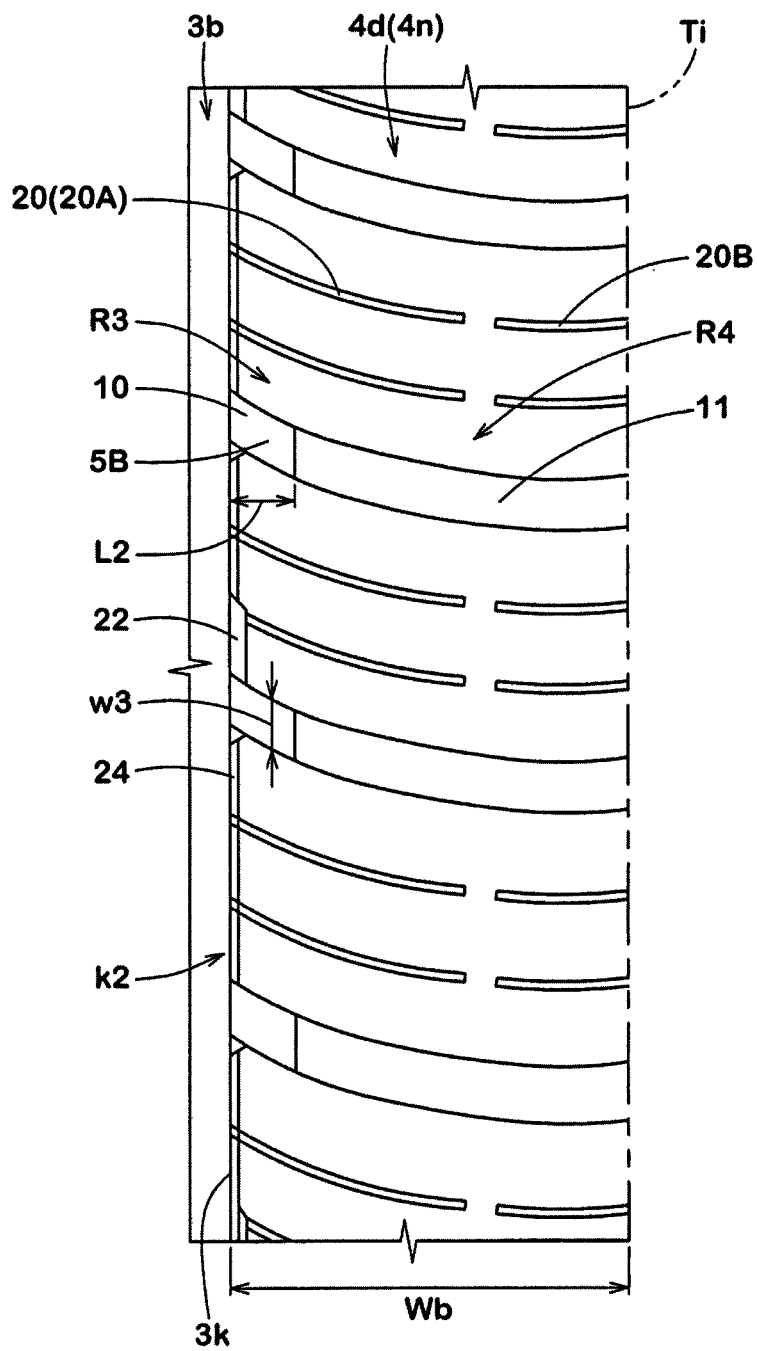
FIG. 4 is an enlarged view of an inner shoulder land portion in FIG. 1.
Figure 5:
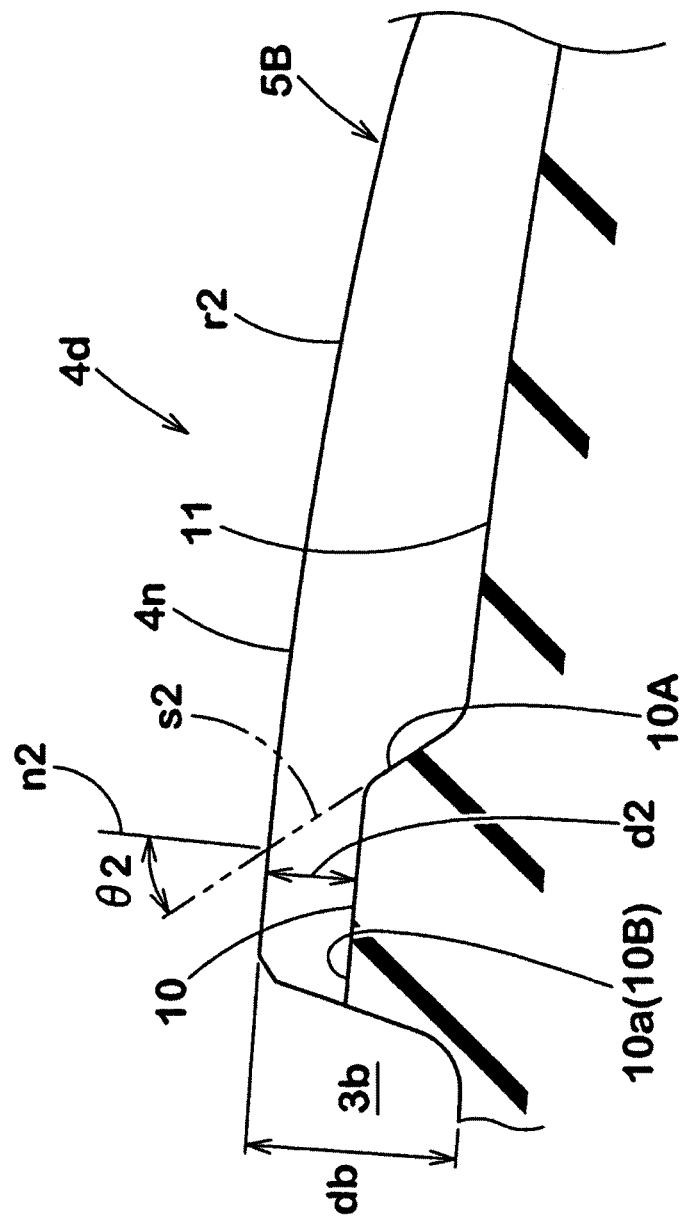
FIG. 5 is a cross-sectional view taken along a line B-B in FIG. 1.

FIG. 4 is a development of the inner shoulder land portion 4d. FIG. 5 is a cross-sectional view taken along a line B-B in FIG. 1. As shown in FIG. 4 and FIG. 5, the inner shoulder land portion 4d has inner shoulder lateral grooves 5B extending in the tire axial direction. Each inner shoulder lateral groove 5B of the present embodiment extends from the inner shoulder main groove 3b toward the inner tread edge Ti side. Each inner shoulder lateral groove 5B of the present embodiment includes a tie bar 10 raised at the groove bottom thereof. The tie bar 10 is connected to the inner shoulder main groove 3b. In the present embodiment, the inner shoulder lateral groove 5B includes the tie bar 10 and a non-raised surface 11 that is not raised at the groove bottom. In the present embodiment, the non-raised surface 11 is located at the inner tread edge Ti side with respect to the tie bar 10.

Such an outer shoulder lateral groove 5A reduces the difference between the stiffness of a region R2 near the second outer portion 9 and the stiffness of a region R1 near the first outer portion 8 in the outer shoulder land portion 4c. Thus, great friction force is exerted on a road surface over a wide range of a tread surface 4k of the outer shoulder land portion 4c. In addition, the inner shoulder lateral groove 5B also reduces the difference between the stiffness of a region R3 near the tie bar 10 and the stiffness of a region R4 near the non-raised surface 11 in the inner shoulder land portion 4d, and thus great friction force is exerted on the road surface over a wide range of a tread surface 4n of the inner shoulder land portion 4d. Furthermore, the second outer portion 9, which has a smaller groove width and groove depth than the first outer portion 8, keeps the stiffness of the region R2 near the second outer portion 9 higher. Accordingly, smooth turn can be made toward both the inner and outer sides of the vehicle. Moreover, the outer shoulder lateral groove 5A and the inner shoulder lateral groove 5B exert an edge effect and snow column shearing force on an ice and snow road surface, and smoothly discharge snow or ice within the respective grooves to the respective shoulder main grooves 3a and 3b. Thus, the tire 1 of the present embodiment is capable of improving steering stability while keeping ice and snow road performance high.

As shown in FIG. 2 to FIG. 5, in the present embodiment, the outer shoulder lateral groove 5A connects the outer tread edge To to the outer shoulder main groove 3a. In the present embodiment, the inner shoulder lateral groove 5B connects the inner tread edge Ti to the inner shoulder main groove 3b. Accordingly, snow or ice within each lateral groove 5A, 5B is also discharged from the outer tread edge To or the inner tread edge Ti.

The groove depth d1 of the second outer portion 9 is preferably smaller than a tie bar depth d2 from the tread surface 4n of the inner shoulder land portion 4d to an outer surface 10a of the tie bar 10. Accordingly, the stiffness of the region R2, near the second outer portion 9, of the outer shoulder land portion 4c is kept even higher, and thus the steering stability is enhanced. In order to exert such action effectively, the groove depth d1 of the second outer portion 9 is further preferably 65% to 85% of the tie bar depth d2.

The groove depth d1 of the second outer portion 9 is not particularly limited, but is preferably 25% to 45% of the groove depth da of the outer shoulder main groove 3a. The tie bar depth d2 is preferably 30% to 50% of the groove depth db of the inner shoulder main groove 3b.

The length L1 in the tire axial direction of the second outer portion 9 is preferably larger than the length L2 in the tire axial direction of the tie bar 10. Accordingly, the stiffness of the region R2, near the second outer portion 9, of the outer shoulder land portion 4c is kept even higher, and thus the steering stability is enhanced. In order to exert such action effectively, the length L1 in the tire axial direction of the second outer portion 9 is preferably 150% to 250% of the length L2 in the tire axial direction of the tie bar 10.

The length L1 in the tire axial direction of the second outer portion 9 is not particularly limited, but is preferably 20% to 40% of the width Wa in the tire axial direction of the outer shoulder land portion 4c. The length L2 in the tire axial direction of the tie bar 10 is preferably 5% to 25% of the width Wb in the tire axial direction of the inner shoulder land portion 4d.

The groove width w1 of the second outer portion 9 is preferably equal to or greater than 1.5 mm. Such a second outer portion 9 allows snow or ice within the outer shoulder lateral groove 5A to be smoothly discharged to the outer shoulder main groove 3a. In order to exert such action effectively, the groove width w1 of the second outer portion 9 is further preferably equal to or greater than 2.0 mm. In order to enhance the steering stability, the groove width w1 of the second outer portion 9 is preferably equal to or less than 4.0 mm and further preferably equal to or less than 3.5 mm.

As shown in FIG. 3, the groove bottom of the second outer portion 9 includes a first outer surface 9A and a second outer surface 9B. The first outer surface 9A is connected to the groove bottom of the first outer portion 8 and greatly inclined relative to the tire radial direction. The second outer surface 9B connects the first outer surface 9A to the outer shoulder main groove 3a and extends along the tread surface 4k of the outer shoulder land portion 4c. Such a first outer surface 9A reduces the stiffness step between the region R1 near the first outer portion 8 and the region R2 near the second outer portion 9 to improve the steering stability and also to maintain smooth flow of snow or ice within the groove.

As shown in FIG. 5, the tie bar 10 includes a first inner surface 10A that extends from the non-raised surface 11 so as to be inclined relative to the tire radial direction, and a second inner surface 10B that connects the first inner surface 10A to the inner shoulder main groove 3b and that extends along the tread surface 4n of the inner shoulder land portion 4d. Such a first inner surface 10A reduces the stiffness step between the region R3 near the tie bar 10 and the region R4 near the non-raised surface 11 to improve the steering stability and also to maintain smooth flow of snow or ice within the lateral groove.

As shown in FIG. 3 and FIG. 5, an angle θ1 of the first outer surface 9A is preferably larger than an angle θ2 of the first inner surface 10A. Accordingly, the stiffness step of the outer shoulder land portion 4c can be made smoother than that of the inner shoulder land portion 4d, and thus the steering stability can be further enhanced. In order to exert such action effectively, the angle θ1 of the first outer surface 9A is preferably, for example, 35 to 55 degrees. The angle θ2 of the first inner surface 10A is preferably, for example, 30 to 50 degrees.

The angle θ1 is the angle between a first normal line n1 and a first virtual line s1 obtained by extending the first outer surface 9A outward in the tire radial direction on a tire meridian cross-section passing through the first outer surface 9A. The first normal line n1 is located at the point of intersection of the first virtual line s1 and a first virtual tread surface r1 obtained by filling the outer shoulder lateral groove 5A. In addition, the angle θ2 is the angle between a second normal line n2 and a second virtual line s2 obtained by extending the first inner surface 10A outward in the tire radial direction on a tire meridian cross-section passing through the first inner surface 10A. The second normal line n2 is located at the point of intersection of the second virtual line s2 and a second virtual tread surface r2 obtained by filling the inner shoulder lateral groove 5B.

As shown in FIG. 2, in the present embodiment, the first outer portion 8 extends in the tire axial direction with a substantially uniform groove width w2. In the present embodiment, the second outer portion 9 extends in the tire axial direction with the substantially uniform groove width w1. In the present specification, the groove widths of the outer shoulder lateral groove 5A and the inner shoulder lateral groove 5B are lengths parallel to the tire circumferential direction.

The groove width w2 of the first outer portion 8 is not particularly limited, but is preferably about 5% to 25% of the width Wa in the tire axial direction of the outer shoulder land portion 4c.

In the present embodiment, the outer shoulder land portion 4c has outer shoulder sipes 14 extending in the tire axial direction. In the present embodiment, the outer shoulder sipes 14 include first outer shoulder sipes 14A and second outer shoulder sipes 14B. Each first outer shoulder sipe 14A of the present embodiment terminates at both ends thereof within the outer shoulder land portion 4c. Each second outer shoulder sipe 14B has an inner end located outward of the first outer shoulder sipe 14A in the tire axial direction, and extends to the outer tread edge To. Such outer shoulder sipes 14 maintain the ice and snow road performance while inhibiting an excessive reduction in the stiffness of the outer shoulder land portion 4c. In the present specification, a sipe is defined as a cut having a width less than 1.5 mm and is distinguished from a groove having a width equal to or greater than 1.5 mm.

In the present embodiment, the outer shoulder land portion 4c has circumferential recesses 16, and chamfers 17 that are recessed less than the circumferential recesses 16. In the present embodiment, the circumferential recesses 16 and the chamfers 17 are provided at a corner portion k1 between the tread surface 4k of the outer shoulder land portion 4c and a groove wall 3f of the outer shoulder main groove 3a.

In the present embodiment, each circumferential recess 16 includes a wall portion 16a extending from the tread surface 4k inward in the tire radial direction, and a bottom portion 16b that extends from the inner end in the tire radial direction of the wall portion 16a along the tread surface 4k and that is connected to the groove wall 3f. Such a circumferential recess 16 exerts snow column shearing force. In the present embodiment, each chamfer 17 is formed as an inclined surface 17a that is more gently inclined relative to the tire radial direction than the groove wall 3f of the outer shoulder main groove 3a. The circumferential recesses 16 and the chamfers 17 are not limited to such modes.

Each circumferential recess 16 is, for example, connected to the second outer portion 9. Each chamfer 17 is, for example, connected to the second outer portion 9 or the circumferential recess 16.

As shown in FIG. 4, the groove width W3 of the inner shoulder lateral groove 5B is preferably 5% to 15% of the width Wb in the tire axial direction of the inner shoulder land portion 4d.

In the present embodiment, the inner shoulder land portion 4d has inner shoulder sipes 20 extending in the tire axial direction. In the present embodiment, the inner shoulder sipes 20 include first inner shoulder sipes 20A and second inner shoulder sipes 20B. Each first inner shoulder sipe 20A of the present embodiment extends from the inner shoulder main groove 3b outward in the tire axial direction, and terminates within the inner shoulder land portion 4d. Each second inner shoulder sipe 20B has an inner end located outward of the first inner shoulder sipe 20A in the tire axial direction, and extends to the inner tread edge Ti.

In the present embodiment, the inner shoulder land portion 4d has circumferential recesses 22, and chamfers 24 that are recessed less than the circumferential recesses 22. In the present embodiment, the circumferential recesses 22 and the chamfers 24 are provided at a corner portion k2 between the tread surface 4n of the inner shoulder land portion 4d and a groove wall 3k of the inner shoulder main groove 3b. Each circumferential recess 22 is, for example, connected to the inner shoulder lateral groove 5B. Each chamfer 24 is, for example, connected to the inner shoulder lateral groove 5B or the circumferential recess 22.

The circumferential recesses 22 are formed in the same manner as the circumferential recesses 16 provided on the outer shoulder land portion 4c, and thus the detailed description thereof is omitted. The chamfers 24 are also formed in the same manner as the chamfers 17 provided on the outer shoulder land portion 4c, and thus the detailed description thereof is omitted.

Figure 6:
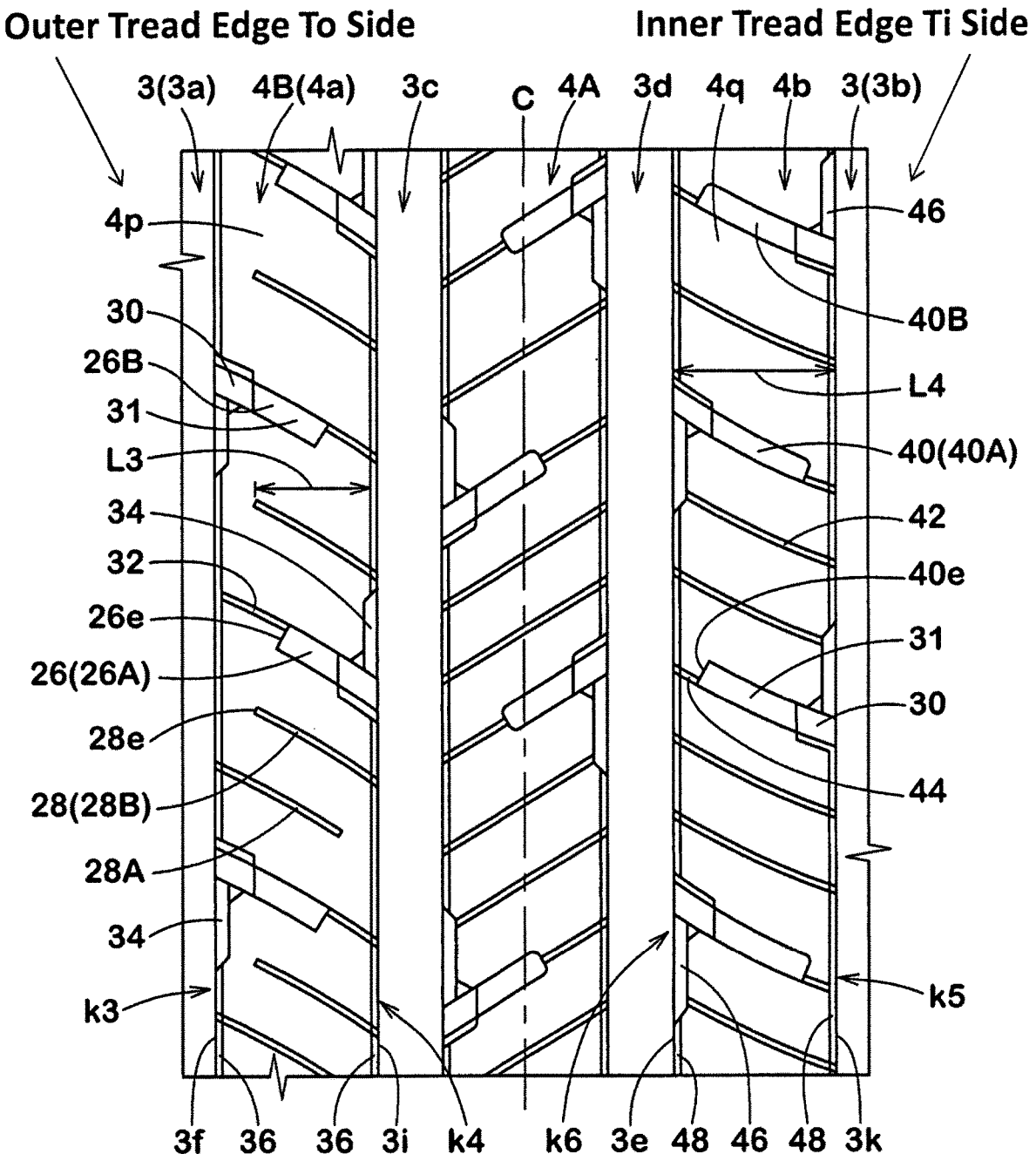
FIG. 6 is an enlarged view of middle land portions and a crown land portion in FIG. 1.

FIG. 6 is a development of the middle land portions 4B and the crown land portion 4A. As shown in FIG. 6, the outer middle land portion 4a of the present embodiment has outer middle lateral grooves 26 extending in the tire axial direction, and outer middle sipes 28 extending in the tire axial direction.

Each outer middle lateral groove 26 includes a first portion 30 that communicates with the main groove 3, and a second portion 31 that is connected to the first portion 30. In the present embodiment, the first portion 30 has a larger groove width than the second portion 31. Such an outer middle lateral groove 26 smoothly discharges snow or ice held within the second portion 31, and thus keeps the ice and snow road performance high.

The outer middle lateral grooves 26 of the present embodiment include first outer middle lateral grooves 26A that extend from the outer crown main groove 3c and that terminate within the outer middle land portion 4a, and second outer middle lateral grooves 26B that extend from the outer shoulder main groove 3a and that terminate within the outer middle land portion 4a. Such outer middle lateral grooves 26 that terminate within the land portion can maintain the stiffness of the outer middle land portion 4a, and, furthermore, serve to maintain the steering stability. In addition, the outer middle lateral grooves 26, together with the respective main grooves 3a and 3c, can form large snow columns to enhance the ice and snow road performance.

The first outer middle lateral grooves 26A and the second outer middle lateral grooves 26B are alternately provided in the tire circumferential direction. Accordingly, great snow column shearing force can be exerted, and the stiffness of the outer middle land portion 4a can be ensured in a well-balanced manner in the tire axial direction, so that the steering stability can be maintained.

Each outer middle sipe 28 of the present embodiment has one end 28e located within the outer middle land portion 4a. Such an outer middle sipe 28 has good ice and snow road performance, and also keeps the stiffness of the outer middle land portion 4a high to enhance the steering stability.

In the present embodiment, the outer middle sipes 28 include first outer middle sipes 28A that communicate with the outer shoulder main groove 3a, and second outer middle sipes 28B that communicate with the outer crown main groove 3c.

The number of the first outer middle sipes 28A is smaller than the number of the second outer middle sipes 28B. Accordingly, the stiffness of a region, at the outer end side in the tire axial direction, of the outer middle land portion 4a on which relatively great lateral force acts is kept higher than the stiffness of a region, at the inner end side in the tire axial direction, of the outer middle land portion 4a. Thus, the steering stability is improved.

The outer middle land portion 4a has outer connection sipes 32 each of which connects an inner end 26e of the outer middle lateral groove 26 to the main groove 3. Such outer connection sipes 32 each serve to increase deformation of the outer middle lateral groove 26 and smoothly discharge snow or ice to the main groove 3 when the outer middle lateral groove 26 comes into contact with the ground.

The outer middle land portion 4a has, for example, circumferential recesses 34, and chamfers 36 that are recessed less than the circumferential recesses 34. In the present embodiment, the circumferential recesses 34 and the chamfers 36 are provided at a corner portion k3 between a tread surface 4p of the outer middle land portion 4a and the groove wall 3f of the outer shoulder main groove 3a and at a corner portion k4 between the tread surface 4p and a groove wall 3i of the outer crown main groove 3c. Each circumferential recess 34 is, for example, connected to the inner shoulder lateral groove 5B. Each chamfer 36 is, for example, connected to the inner shoulder lateral groove 5B or the circumferential recess 34.

Each outer middle sipe 28 communicates only with the chamfer 36 without communicating with the circumferential recess 34. Such an outer middle sipe 28 inhibits a reduction in the stiffness of the outer middle land portion 4a.

The circumferential recesses 34 are formed in the same manner as the circumferential recesses 16 provided on the outer shoulder land portion 4c, and thus the detailed description thereof is omitted. The chamfers 36 are also formed in the same manner as the chamfers 17 provided on the outer shoulder land portion 4c, and thus the detailed description thereof is omitted.

The inner middle land portion 4b has inner middle lateral grooves 40 extending in the tire axial direction, and inner middle sipes 42 extending in the tire axial direction.

Each inner middle lateral groove 40 includes a first portion 30 that communicates with the main groove 3, and a second portion 31 that is connected to the first portion 30. In the present embodiment, the first portion 30 has a larger groove width than the second portion 31. Such an inner middle lateral groove 40 smoothly discharges snow or ice held within the second portion 31, and thus keeps the ice and snow road performance high.

The inner middle lateral grooves 40 of the present embodiment include first inner middle lateral grooves 40A that extend from the inner crown main groove 3d and that terminate within the inner middle land portion 4b, and second inner middle lateral grooves 40B that extend from the inner shoulder main groove 3b and that terminate within the inner middle land portion 4b. Such inner middle lateral grooves 40 that terminate within the land portion can maintain the stiffness of the inner middle land portion 4b, and, furthermore, serve to maintain the steering stability.

Moreover, the inner middle lateral grooves 40, together with the respective main grooves 3b and 3d, can form large snow columns to enhance the ice and snow road performance.

The first inner middle lateral grooves 40A and the second inner middle lateral grooves 40B are alternately provided in the tire circumferential direction. Accordingly, great snow column shearing force can be exerted, and the stiffness of the inner middle land portion 4b can be ensured in a well-balanced manner in the tire axial direction, so that the steering stability can be maintained.

The inner middle sipes 42 of the present embodiment cross the inner middle land portion 4b. Such inner middle sipes 42 exhibit good ice and snow road performance.

The length L3 in the tire axial direction of each outer middle sipe 28 is preferably smaller than the length L4 in the tire axial direction of each inner middle sipe 42, and is further preferably 75% to 90% of the length L4 in the tire axial direction of each inner middle sipe 42. Accordingly, the stiffness of the outer middle land portion 4a can be kept higher than the stiffness of the inner middle land portion 4b, and thus smooth turn can be made toward both the inner and outer sides of the vehicle.

The inner middle land portion 4b has inner connection sipes 44 each of which connects an inner end 40e of the inner middle lateral groove 40 to the main groove 3. Such inner connection sipes 44 each serve to increase deformation of the inner middle lateral groove 40 and smoothly discharge snow or ice to the main groove 3 when the inner middle lateral groove 40 comes into contact with the ground.

The inner middle land portion 4b has, for example, circumferential recesses 46, and chamfers 48 that are recessed less than the circumferential recesses 46. In the present embodiment, the circumferential recesses 46 and the chamfers 48 are provided at a corner portion k5 between a tread surface 4q of the inner middle land portion 4b and the groove wall 3k of the inner shoulder main groove 3b and at a corner portion k6 between the tread surface 4q and a groove wall 3e of the inner crown main groove 3d. Each circumferential recess 46 is, for example, connected to the inner middle lateral groove 40. Each chamfer 48 is, for example, connected to the inner middle lateral groove 40 or the circumferential recess 46.

In the present embodiment, the inner middle sipes 42 are connected to the circumferential recesses 46. Such circumferential recesses 46 greatly deform when coming into contact with the ground, and thus can effectively discharge snow or ice within the circumferential recesses 46.

The circumferential recesses 46 are formed in the same manner as the circumferential recesses 16 provided on the outer shoulder land portion 4c, and thus the detailed description thereof is omitted. The chamfers 48 are also formed in the same manner as the chamfers 17 provided on the outer shoulder land portion 4c, and thus the detailed description thereof is omitted.

Figure 7:
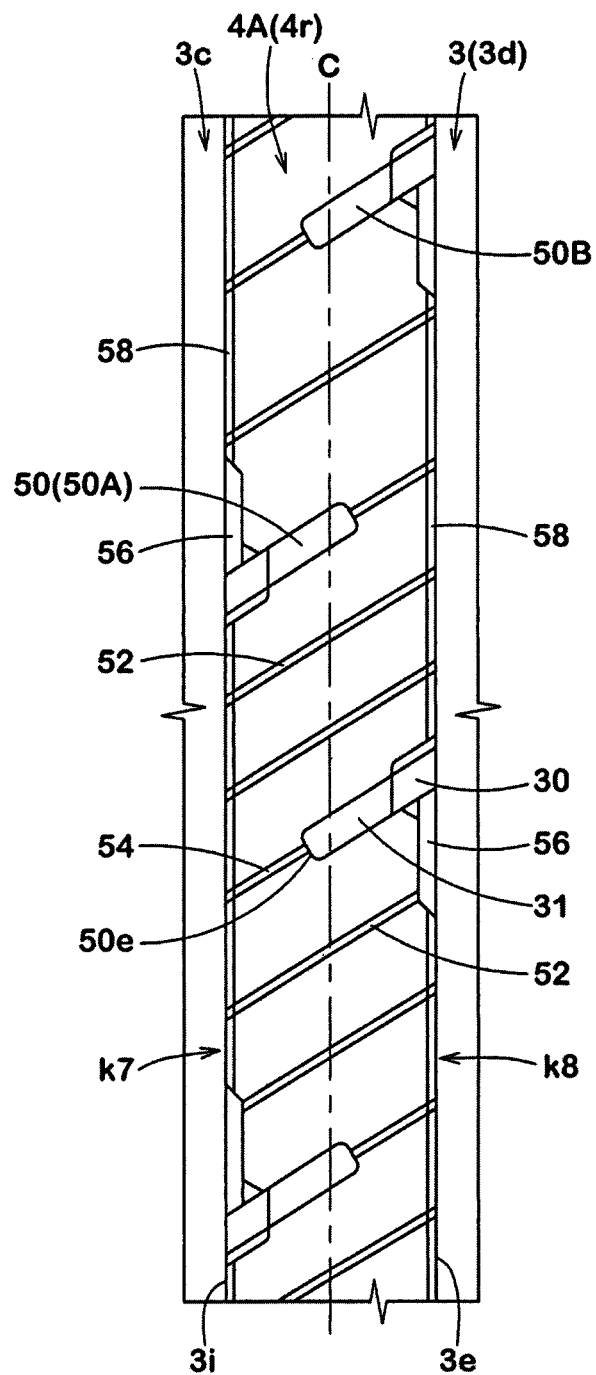
FIG. 7 is an enlarged view of the crown land portion in FIG. 1.

FIG. 7 is a development of the crown land portion 4A. As shown in FIG. 7, the crown land portion 4A has crown lateral grooves 50 extending in the tire axial direction, and crown sipes 52 extending in the tire axial direction.

Each crown lateral groove 50 includes a first portion 30 that communicates with the main groove 3, and a second portion 31 that is connected to the first portion 30. In the present embodiment, the first portion 30 has a larger groove width than the second portion 31. Such a crown lateral groove 50 smoothly discharges snow or ice held within the second portion 31, and thus keeps the ice and snow road performance high.

The crown lateral grooves 50 of the present embodiment include first crown lateral grooves 50A that extend from the outer crown main groove 3c and that terminate within the crown land portion 4A, and second crown lateral grooves 50B that extend from the inner crown main groove 3d and that terminate within the crown land portion 4A. Such crown lateral grooves 50 that terminate within the land portion can maintain the stiffness of the crown land portion 4A, and, furthermore, serve to maintain the steering stability. Moreover, the crown lateral grooves 50, together with the respective main grooves 3c and 3d, can form large snow columns to enhance the ice and snow road performance.

The first crown lateral grooves 50A and the second crown lateral grooves 50B are alternately provided in the tire circumferential direction. Accordingly, great snow column shearing force can be exerted, and the stiffness of the crown land portion 4A can be ensured in a well-balanced manner in the tire axial direction, so that the steering stability can be maintained.

The crown sipes 52 of the present embodiment cross the crown land portion 4A. Such crown sipes 52 exhibit good ice and snow road performance.

The crown land portion 4A has crown connection sipes 54 each of which connects an inner end 50e of the crown lateral groove 50 to the main groove 3. Such crown connection sipes 54 each serve to increase deformation of the crown lateral groove 50 and smoothly discharge snow or ice to the main groove 3 when the crown lateral groove 50 comes into contact with the ground.

The crown land portion 4A has, for example, circumferential recesses 56, and chamfers 58 that are recessed less than the circumferential recesses 56. In the present embodiment, the circumferential recesses 56 and the chamfers 58 are provided at a corner portion k7 between a tread surface 4r of the crown land portion 4A and the groove wall 3i of the outer crown main groove 3c and at a corner portion k8 between the tread surface 4r and the groove wall 3e of the inner crown main groove 3d. Each circumferential recess 56 is, for example, connected to the crown lateral groove 50. Each chamfer 58 is, for example, connected to the crown lateral groove 50 or the circumferential recess 56.

In the present embodiment, the crown sipes 52 are connected to the circumferential recesses 56. Such circumferential recesses 56 greatly deform when coming into contact with the ground, and thus can effectively discharge snow or ice within the circumferential recesses 56.

The circumferential recesses 56 are formed in the same manner as the circumferential recesses 16 provided on the outer shoulder land portion 4c, and thus the detailed description thereof is omitted. The chamfers 58 are also formed in the same manner as the chamfers 17 provided on the outer shoulder land portion 4c, and thus the detailed description thereof is omitted.

Although the tire according to the embodiment of the present invention has been described in detail above, the present invention is not limited to the above specific embodiments, and various modifications can be made to implement the present invention.

EXAMPLES

Tires with a size of 215/60R16 having the basic pattern in FIG. 1 were produced as sample tires on the basis of specifications in Table 1, and were tested for ice and snow road performance and steering stability. The common specifications and the test method for all the sample tires are as follows.

Maximum groove depth of outer shoulder lateral groove: 7.0 mm

Maximum groove depth of inner shoulder lateral groove: 7.0 mm

<Ice and Snow Road Performance/Steering Stability>

The sample tires were mounted to all the wheels of a front-wheel-drive vehicle having an engine displacement of 1500 cc, under the following conditions, and a test driver drove the vehicle on a test course with an ice and snow road surface and on a test course with a dry asphalt road surface. Sensory evaluation was made by the test driver for running characteristics regarding handling responsiveness, traction, grip performance, and the like at that time. The results are indicated as scores with the result of Comparative Example 1 being regarded as 100. A higher numerical value indicates that the result is better.

Rim (all wheels): 16×6.5J

Internal pressure (all wheels): 240 kPa

TABLE 1

| | Comparative Example 1 | Comparative Example 2 | Example 1 | Example 2 | Example 3 | Example 2 | Example 3 | Example 4 | Example 5 | Example 6 |
|---|---|---|---|---|---|---|---|---|---|---|
| Presence/absence of second outer portion | Absence | Absence | Presence | Presence | Presence | Presence | Presence | Presence | Presence | Presence |
| Presence/absence of tie bar | Absence | Presence | Presence | Presence | Presence | Presence | Presence | Presence | Presence | Presence |
| Groove depth ratio d1/d2 (%) | — | — | 70 | 60 | 65 | 85 | 90 | 70 | 70 | 70 |
| Length ratio L1/L2 (%) | — | — | 200 | 200 | 200 | 200 | 200 | 145 | 150 | 200 |
| Groove depth ratio d2 (mm) | — | 3.5 | 3.5 | 3.5 | 3.5 | 3.5 | 3.5 | 3.5 | 3.5 | 3.5 |
| Length ratio L2/Wb (%) | — | 15 | 15 | 15 | 15 | 15 | 15 | 15 | 15 | 15 |
| θ1 (degrees) | — | — | 45 | 45 | 45 | 45 | 45 | 45 | 45 | 45 |
| θ2 (degrees) | — | 40 | 40 | 40 | 40 | 40 | 40 | 40 | 40 | 40 |
| Ice and snow road performance [Score: higher value is better] | 100 | 95 | 105 | 102 | 105 | 105 | 105 | 102 | 105 | 105 |
| Steering stability [Score: higher value is better] | 100 | 108 | 120 | 122 | 120 | 120 | 115 | 122 | 120 | 115 |

As a result of the test, it was confirmed that the tires of the examples exhibit good steering stability while maintaining ice and snow road performance.

What is claimed is:

1. A tire comprising:
a tread portion having a designated mounting direction to a vehicle,
wherein:
the tread portion has an outer tread edge and an inner tread edge located at an outer side of the vehicle and at an inner side of the vehicle, respectively, when the tire is mounted on the vehicle,
the tread portion includes:
main grooves each continuously extending in a tire circumferential direction, the main grooves including an outer shoulder main groove continuously extending in the tire circumferential direction at an endmost outer tread edge side, and an inner shoulder main groove continuously extending in the tire circumferential direction at an endmost inner tread edge side,
an outer shoulder land portion demarcated between the outer tread edge and the outer shoulder main groove,
an inner shoulder land portion demarcated between the inner tread edge and the inner shoulder main groove, and
at least one land portion that is disposed between the outer shoulder main groove and the inner shoulder main groove, and that is disposed between the outer shoulder land portion and the inner shoulder land portion,
the outer shoulder land portion has outer shoulder lateral grooves extending from the outer shoulder main groove toward the outer tread edge side,
the inner shoulder land portion includes:
inner shoulder lateral grooves extending from the inner shoulder main groove toward the inner tread edge side,
chamfers extending in the tire circumferential direction and forming a circumferential edge of the inner shoulder land portion that directly abuts the inner shoulder main groove, and
at least one circumferential recess longitudinally extending in the tire circumferential direction and including a circumferential inner edge that directly abuts the inner shoulder main groove, a width of the at least one circumferential recess in a tire axial direction being greater than a width of the chamfers of the inner shoulder land portion in the tire axial direction, and the at least one circumferential recess being recessed more than the chamfers of the inner shoulder land portion,
the at least one land portion includes lateral grooves each including:
a first portion communicating with one of the main grooves, and
a second portion connected to the first portion so that the first portion is disposed between the one of the main grooves and the second portion,
the first portion has a larger groove width than the second portion, and
the at least one land portion includes chamfers that extend in the tire circumferential direction and form at least one circumferential edge of the at least one land portion that directly abuts at least one of the main grooves,
each of the outer shoulder lateral grooves includes a first outer portion extending in the tire axial direction at the outer tread edge side, and a second outer portion that connects the first outer portion to the outer shoulder main groove and that has a smaller groove width and groove depth than the first outer portion,
each of the inner shoulder lateral grooves has a tie bar raised at a groove bottom thereof, and the tie bar is connected to the inner shoulder main groove,
at least one of the tie bars is directly connected to the at least one circumferential recess, so that the at least one of the tie bars is sandwiched between the at least one circumferential recess and one of the chamfers of the inner shoulder land portion,
wherein the groove bottom of the second outer portion includes a first outer surface and a second outer surface,
the first outer surface is connected to the groove bottom of the first outer portion and greatly inclined relative to the tire radial direction,
wherein the tie bar includes a first inner surface that extends from the non-raised surface so as to be inclined relative to the tire radial direction,
an angle θ1 of the first outer surface relative to the tire radial direction is larger than an angle θ2 of the first inner surface relative to the tire radial direction,
the angle θ1 of the first outer surface is in a range of 35 to 55 degrees, and
the angle θ2 of the first inner surface is in a range of 30 to 50 degrees.

2. A tire comprising:
a tread portion having a designated mounting direction to a vehicle,
wherein:
the tread portion has an outer tread edge and an inner tread edge located at an outer side of the vehicle and at an inner side of the vehicle, respectively, when the tire is mounted on the vehicle,
the tread portion has an outer shoulder main groove continuously extending in a tire circumferential direction at the endmost outer tread edge side, an inner shoulder main groove continuously extending in the tire circumferential direction at the endmost inner tread edge side, an outer shoulder land portion demarcated between the outer tread edge and the outer shoulder main groove, and an inner shoulder land portion demarcated between the inner tread edge and the inner shoulder main groove,
the outer shoulder land portion has outer shoulder lateral grooves extending from the outer shoulder main groove toward the outer tread edge side,
the inner shoulder land portion includes:
inner shoulder lateral grooves extending from the inner shoulder main groove toward the inner tread edge side,
chamfers extending in the tire circumferential direction and forming a circumferential edge of the inner shoulder land portion that directly abuts the inner shoulder main groove, and
at least one circumferential recess longitudinally extending in the tire circumferential direction and including a circumferential inner edge that directly abuts the inner shoulder main groove, a width of the at least one circumferential recess in a tire axial direction being greater than a width of the chamfers of the inner shoulder land portion in the tire axial direction, and the at least one circumferential recess being recessed more than the chamfers of the inner shoulder land portion, each of the outer shoulder lateral grooves includes a first outer portion extending in the tire axial direction at the outer tread edge side, and a second outer portion that connects the first outer portion to the outer shoulder main groove and that has a smaller groove width and groove depth than the first outer portion, each of the inner shoulder lateral grooves has a uniform width along an entirety of a length thereof, the length thereof extending across an entirety of the inner shoulder land portion, each of the inner shoulder lateral grooves has a tie bar raised at a groove bottom thereof, and the tie bar is connected to the inner shoulder main groove, at least one of the tie bars is directly connected to the at least one circumferential recess, so that the at least one of the tie bars is sandwiched between the at least one circumferential recess and one of the chamfers of the inner shoulder land portion, wherein the tread portion includes at least one land portion that is disposed between the outer shoulder main groove and the inner shoulder main groove, and the at least one land portion includes an inner middle land portion, wherein the inner middle land portion includes:
chamfers extending in the tire circumferential direction and forming a circumferential edge of the inner middle land portion that directly abuts the inner shoulder main groove, and
at least one circumferential recess longitudinally extending in the tire circumferential direction and including a circumferential inner edge that directly abuts the inner shoulder main groove, a width of the at least one circumferential recess of the inner middle land portion in the tire axial direction being greater than a width of the chamfers of the inner middle land portion in the tire axial direction, and the at least one circumferential recess of the inner middle land portion being recessed more than the chamfers of the inner middle land portion, wherein the at least one land portion that is disposed between the outer shoulder main groove and the inner shoulder main groove includes an outer middle land portion, and wherein the outer middle land portion includes:
chamfers extending in the tire circumferential direction and forming a circumferential edge of the outer middle land portion that directly abuts the outer shoulder main groove, and
at least one circumferential recess longitudinally extending in the tire circumferential direction and including a circumferential outer edge that directly abuts the outer shoulder main groove, a width of the at least one circumferential recess of the outer middle land portion in the tire axial direction being greater than a width of the chamfers of the outer middle land portion in the tire axial direction, and the at least one circumferential recess of the outer middle land portion being recessed more than the chamfers of the outer middle land portion.

3. A tire comprising:
a tread portion having a designated mounting direction to a vehicle,
wherein:
the tread portion has an outer tread edge and an inner tread edge located at an outer side of the vehicle and at an inner side of the vehicle, respectively, when the tire is mounted on the vehicle, the tread portion includes:
main grooves each continuously extending in a tire circumferential direction, the main grooves including an outer shoulder main groove continuously extending in the tire circumferential direction at an endmost outer tread edge side, and an inner shoulder main groove continuously extending in the tire circumferential direction at an endmost inner tread edge side,
an outer shoulder land portion demarcated between the outer tread edge and the outer shoulder main groove,
an inner shoulder land portion demarcated between the inner tread edge and the inner shoulder main groove, and
at least one land portion that is disposed between the outer shoulder main groove and the inner shoulder main groove, and that is disposed between the outer shoulder land portion and the inner shoulder land portion, the outer shoulder land portion has outer shoulder lateral grooves extending from the outer shoulder main groove toward the outer tread edge side, the inner shoulder land portion includes:
inner shoulder lateral grooves extending from the inner shoulder main groove toward the inner tread edge side, the outer shoulder land portion includes:
chamfers extending in the tire circumferential direction and forming a circumferential edge of the outer shoulder land portion that directly abuts the outer shoulder main groove, and
at least one circumferential recess longitudinally extending in the tire circumferential direction and including a circumferential inner edge that directly abuts the outer shoulder main groove, a width of the at least one circumferential recess in a tire axial direction being greater than a width of the chamfers of the outer shoulder land portion in the tire axial direction, and the at least one circumferential recess being recessed more than the chamfers of the outer shoulder land portion, the at least one land portion includes lateral grooves each including:
a first portion communicating with one of the main grooves, and
a second portion connected to the first portion so that the first portion is disposed between the one of the main grooves and the second portion, the first portion has a larger groove width than the second portion, and the at least one land portion includes chamfers that extend in the tire circumferential direction and form at least one circumferential edge of the at least one land portion that directly abuts at least one of the main grooves, each of the outer shoulder lateral grooves includes a first outer portion extending in the tire axial direction at the outer tread edge side, and a second outer portion that connects the first outer portion to the outer shoulder main groove and that has a smaller groove width and groove depth than the first outer portion, each of the inner shoulder lateral grooves has a tie bar raised at a groove bottom thereof, and the tie bar is connected to the inner shoulder main groove, at least one of the second outer portion is directly connected to the at least one circumferential recess, so that the at least one of the second outer portion is sandwiched between the at least one circumferential recess and one of the chamfers of the outer shoulder land portion, wherein the at least one land portion that is disposed between the outer shoulder main groove and the inner shoulder main groove includes an inner middle land portion, and wherein the inner middle land portion includes:
  chamfers extending in the tire circumferential direction and forming a circumferential edge of the inner middle land portion that directly abuts the inner shoulder main groove, and
  at least one circumferential recess longitudinally extending in the tire circumferential direction and including a circumferential inner edge that directly abuts the inner shoulder main groove, a width of the at least one circumferential recess of the inner middle land portion in the tire axial direction being greater than a width of the chamfers of the inner middle land portion in the tire axial direction, and the at least one circumferential recess of the inner middle land portion being recessed more than the chamfers of the inner middle land portion, wherein the at least one land portion that is disposed between the outer shoulder main groove and the inner shoulder main groove includes an outer middle land portion, and wherein the outer middle land portion includes:
  chamfers extending in the tire circumferential direction and forming a circumferential edge of the outer middle land portion that directly abuts the outer shoulder main groove, and
at least one circumferential recess longitudinally extending in the tire circumferential direction and including a circumferential outer edge that directly abuts the outer shoulder main groove, a width of the at least one circumferential recess of the outer middle land portion in the tire axial direction being greater than a width of the chamfers of the outer middle land portion in the tire axial direction, and the at least one circumferential recess of the outer middle land portion being recessed more than the chamfers of the outer middle land portion.

4. A tire comprising:
a tread portion having a designated mounting direction to a vehicle,
wherein:
the tread portion has an outer tread edge and an inner tread edge located at an outer side of the vehicle and at an inner side of the vehicle, respectively, when the tire is mounted on the vehicle,
the tread portion includes:
  main grooves each continuously extending in a tire circumferential direction, the main grooves including an outer shoulder main groove continuously extending in the tire circumferential direction at an endmost outer tread edge side, and an inner shoulder main groove continuously extending in the tire circumferential direction at an endmost inner tread edge side,
  an outer shoulder land portion demarcated between the outer tread edge and the outer shoulder main groove,
  an inner shoulder land portion demarcated between the inner tread edge and the inner shoulder main groove, and
  at least one land portion that is disposed between the outer shoulder main groove and the inner shoulder main groove, and that is disposed between the outer shoulder land portion and the inner shoulder land portion, the outer shoulder land portion has outer shoulder lateral grooves extending from the outer shoulder main groove toward the outer tread edge side, the inner shoulder land portion includes:
  inner shoulder lateral grooves extending from the inner shoulder main groove toward the inner tread edge side,
  chamfers extending in the tire circumferential direction and forming a circumferential edge of the inner shoulder land portion that directly abuts the inner shoulder main groove, and
  at least one circumferential recess longitudinally extending in the tire circumferential direction and including a circumferential inner edge that directly abuts the inner shoulder main groove, a width of the at least one circumferential recess in a tire axial direction being greater than a width of the chamfers of the inner shoulder land portion in the tire axial direction, and the at least one circumferential recess being recessed more than the chamfers of the inner shoulder land portion, the at least one land portion includes lateral grooves each including:
  a first portion communicating with one of the main grooves, and
  a second portion connected to the first portion so that the first portion is disposed between the one of the main grooves and the second portion, the first portion has a larger groove width than the second portion, and the at least one land portion includes chamfers that extend in the tire circumferential direction and form at least one circumferential edge of the at least one land portion that directly abuts at least one of the main grooves, each of the outer shoulder lateral grooves includes a first outer portion extending in the tire axial direction at the outer tread edge side, and a second outer portion that connects the first outer portion to the outer shoulder main groove and that has a smaller groove width and groove depth than the first outer portion, each of the inner shoulder lateral grooves has a tie bar raised at a groove bottom thereof, and the tie bar is connected to the inner shoulder main groove, at least one of the tie bars is directly connected to the at least one circumferential recess, so that the at least one of the tie bars is sandwiched between the at least one circumferential recess and one of the chamfers of the inner shoulder land portion, wherein the at least one land portion that is disposed between the outer shoulder main groove and the inner shoulder main groove includes an inner middle land portion, and wherein the inner middle land portion includes:
  chamfers extending in the tire circumferential direction and forming a circumferential edge of the inner middle land portion that directly abuts the inner shoulder main groove, and
  at least one circumferential recess longitudinally extending in the tire circumferential direction and including a circumferential inner edge that directly abuts the inner shoulder main groove, a width of the at least one circumferential recess of the inner middle land portion in the tire axial direction being greater than a width of the chamfers of the inner middle land portion in the tire axial direction, and the at least one circumferential recess of the inner middle land portion being recessed more than the chamfers of the inner middle land portion, wherein the at least one land portion that is disposed between the outer shoulder main groove and the inner shoulder main groove includes an outer middle land portion, and wherein the outer middle land portion includes:
chamfers extending in the tire circumferential direction and forming a circumferential edge of the outer middle land portion that directly abuts the outer shoulder main groove, and
at least one circumferential recess longitudinally extending in the tire circumferential direction and including a circumferential outer edge that directly abuts the outer shoulder main groove, a width of the at least one circumferential recess of the outer middle land portion in the tire axial direction being greater than a width of the chamfers of the outer middle land portion in the tire axial direction, and the at least one circumferential recess of the outer middle land portion being recessed more than the chamfers of the outer middle land portion.

5. The tire according to claim 4, wherein the groove width of the second outer portion is equal to or greater than 1.5 mm.

6. The tire according to claim 4, wherein:
the at least one land portion of the tread portion includes an outer middle land portion adjacent to an inner side in the tire axial direction of the outer shoulder main groove, and an inner middle land portion adjacent to an inner side in the tire axial direction of the inner shoulder main groove,
the outer middle land portion has outer middle sipes that extend in the tire axial direction and that each have one end located within the outer middle land portion, and
the inner middle land portion has inner middle sipes crossing the inner middle land portion.

7. The tire according to claim 4, wherein:
the inner shoulder land portion has inner shoulder sipes extending in the tire axial direction,
the inner shoulder sipes include first inner shoulder sipes and second inner shoulder sipes,
each first inner shoulder sipe extends from the inner shoulder main groove outward in the tire axial direction, and terminates within the inner shoulder land portion,
each second inner shoulder sipe has an inner end located outward of the first inner shoulder sipe in the tire axial direction, and extends to the inner tread edge.

8. The tire according to claim 4, wherein the outer shoulder land portion includes:
chamfers extending in the tire circumferential direction and forming a circumferential edge of the outer shoulder land portion that directly abuts the outer shoulder main groove, and
at least one circumferential recess longitudinally extending in the tire circumferential direction and including a circumferential inner edge that directly abuts the outer shoulder main groove, a width of the at least one circumferential recess of the outer shoulder land portion in the tire axial direction being greater than a width of the chamfers of the outer shoulder land portion in the tire axial direction, and the at least one circumferential recess of the outer shoulder land portion being recessed more than the chamfers of the outer shoulder land portion, wherein at least one of the second outer portion is directly connected to the at least one circumferential recess of the outer shoulder land portion, so that the at least one of the second outer portion is sandwiched between the at least one circumferential recess of the outer shoulder land portion and one of the chamfers of the outer shoulder land portion.

9. The tire according to claim 4, wherein:
the outer shoulder land portion has outer shoulder sipes extending in the tire axial direction,
the outer shoulder sipes include first outer shoulder sipes and second outer shoulder sipes,
each first outer shoulder sipe terminates at both ends thereof within the outer shoulder land portion,
each second outer shoulder sipe has an inner end located outward of the first outer shoulder sipe in the tire axial direction, and extends to the outer tread edge To.

10. The tire according to claim 9, wherein:
the inner shoulder land portion has inner shoulder sipes extending in the tire axial direction,
the inner shoulder sipes include first inner shoulder sipes and second inner shoulder sipes,
each first inner shoulder sipe extends from the inner shoulder main groove outward in the tire axial direction, and terminates within the inner shoulder land portion,
each second inner shoulder sipe has an inner end located outward of the first inner shoulder sipe in the tire axial direction, and extends to the inner tread edge.

11. The tire according to claim 4, wherein:
the groove bottom of the second outer portion includes a first outer surface and a second outer surface,
the first outer surface is connected to the groove bottom of the first outer portion and greatly inclined relative to the tire radial direction.

12. The tire according to claim 11, wherein:
the tie bar includes a first inner surface that extends from the non-raised surface so as to be inclined relative to the tire radial direction,
an angle $\theta 1$ of the first outer surface relative to the tire radial direction is larger than an angle $\theta 2$ of the first inner surface relative to the tire radial direction.

13. The tire according to claim 4, wherein the second outer portion has a length in the tire axial direction larger than a length in the tire axial direction of the tie bar.

14. The tire according to claim 13, wherein the length in the tire axial direction of the second outer portion is 150% to 250% of the length in the tire axial direction of the tie bar.

15. The tire according to claim 4, wherein the groove depth of the second outer portion is smaller than a tie bar depth from a tread surface of the inner shoulder land portion to an outer surface of the tie bar.

16. The tire according to claim 15, wherein:
the at least one land portion of the tread portion includes an outer middle land portion adjacent to an inner side in the tire axial direction of the outer shoulder main groove, and an inner middle land portion adjacent to an inner side in the tire axial direction of the inner shoulder main groove,
the outer middle land portion has outer middle sipes that extend in the tire axial direction and that each have one end located within the outer middle land portion, and
the inner middle land portion has inner middle sipes crossing the inner middle land portion.

17. The tire according to claim 15, wherein:
the groove bottom of the second outer portion includes a first outer surface and a second outer surface,
the first outer surface is connected to the groove bottom of the first outer portion and greatly inclined relative to the tire radial direction.

18. The tire according to claim 15, wherein the second outer portion has a length in the tire axial direction larger than a length in the tire axial direction of the tie bar.

19. The tire according to claim 18, wherein the length in the tire axial direction of the second outer portion is 150% to 250% of the length in the tire axial direction of the tie bar.

* * * * *